Figure 1:
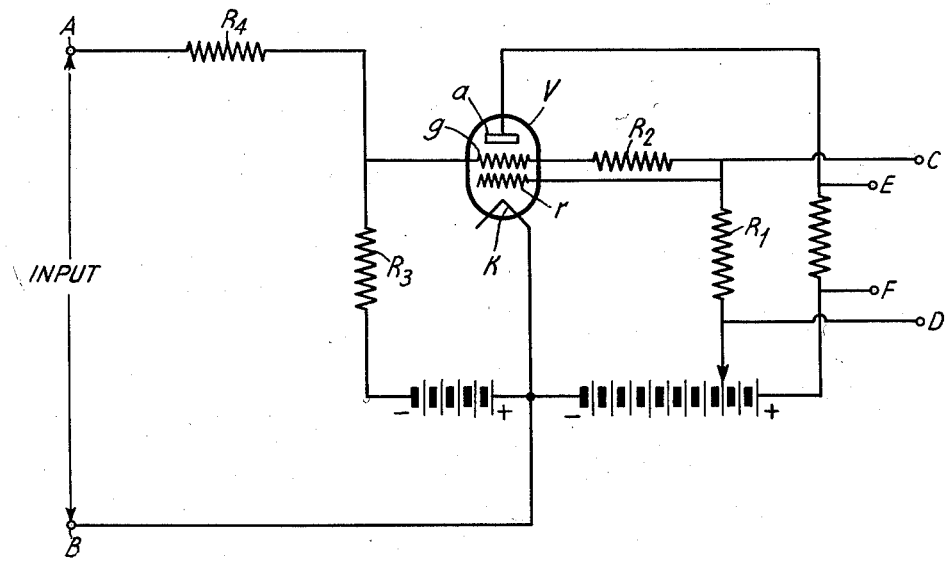

April 4, 1939.  H. O. ROOSENSTEIN  2,153,158

RELAXATION CIRCUIT ARRANGEMENT

Filed March 5, 1935

INVENTOR
HANS OTTO ROOSENSTEIN
BY
ATTORNEY

Patented Apr. 4, 1939

2,153,158

UNITED STATES PATENT OFFICE 2,153,158

RELAXATION CIRCUIT ARRANGEMENT

Hans Otto Roosenstein, Berlin, Germany, assignor to Telefunken Gesellschaft für Drahtlose Telegraphie m. b. H., Berlin, Germany, a corporation of Germany Application March 5, 1935, Serial No. 9,366
In Germany March 6, 1934

3 Claims. (Cl. 250—36)

The present invention is concerned with a method adapted to produce separately excited and self-excited relaxation waves, especially for television purposes, comprising the use of a discharge tube with at least four electrodes.

Circuit schemes designed to the generation of relaxation waves and comprising tubes with several grids are known in the prior art in which tubes the grids are united with the filament only by one path and with the interposition of batteries. But circuit schemes of this kind have been found to be inconstant in that, owing to the time variation of the internal resistance of the batteries, the relaxation frequency experiences alterations. Owing to the relatively high ground capacities of the batteries the relaxation oscillations experienced marked rounding, and this rendered them unserviceable for a good many purposes.

The relaxation wave circuit arrangement comprising the use of multi-grid tubes as here disclosed represents a circuit arrangement which largely fulfills even the severest requirements of the art as regards impulse generators and transmitters.

For a number of electrotechnical purposes means are required which as a result of an impulse are intended to change over into a steady state. In purposes of this kind, such as television, the demand is mostly made that the same should react without any appreciable time lag in response to an impulse, and that for their actuation the control energy should be as low as possible for producing synchronous triggered oscillations.

In many instances relaxation devices are desired which a certain time after the impinging of the controlling impulses should automatically be caused to return to their initial state or which, also in the absence of external impulses, should automatically be capable of maintaining the excitation of permanent relaxation oscillations (unassisted or independent free self-excited relaxation waves).

Both types of relaxation waves, in a circuit scheme of the kind here disclosed, are readily generable by the use of a tube comprising a cathode, an anode, and at least two interposed auxiliary electrodes. This circuit scheme is characterized by this fact that one of the auxiliary electrodes is connected to a voltage source by way of an alternating resistance or impedance to maintain it at a positive value with respect to the cathode, and that a further auxiliary electrode, disposed between the said first auxiliary electrode and the anode, is connected by means of an impedance with the first-named auxiliary electrode, and also connected by means of an impedance in series with a biasing voltage source with the cathode.

The circuit scheme is thus presupposed to contain a tube with at least four electrodes known as a tetrode. By choosing suitable biasing voltages and dynamic parallel connection of the two grids of a tetrode, conditions can be made so that this tube in the grid circuit or the plate circuit exhibits an operating parameter with a drooping or negative characteristic. The prerequisite for this condition is that the plate has impressed upon it such a high positive potential that the sum total of space charge grid current and plate current corresponds approximately to the saturation current while the control grid by an opposite biasing voltage takes but little current. In reference to changes in voltage at the grids this circuit scheme is of a nature of a D. C. amplifier becoming increasingly more sensitive with the increase of value of the resistance connected to the grid adjacent to the cathode and to the voltage source. In the extreme case, the scheme will assume the nature of a relaxation relay, in other words, a system capable of occupying but two stable states. Between the maximum and completely blocked plate current, the system changes under inertialess conditions from one state to the other as a consequence of a suitable impact at the grid or plate circuit. If, then, an energy storage means be introduced between the control and space charge grid, free and independent relaxation waves will be producible.

Arrangements of this sort operate inside the saturation range of a discharge tube. The saturation current is markedly dependent upon the heating of the tube, and the result is that slight changes in the heating current will result in pronounced variations in the operation of the tube. Hence, according to the invention, instead of a tetrode, it will be more advantageous to employ a tube which, by virtue of the special disposition of one or more electrodes between the cathode and the electrode immediately adjacent the cathode occasions an apparent saturation which is approximately independent of the cathode heating. It is known that such apparent or pseudo-saturation currents are produced whenever by the transition of electrons into a field of lower potential (retarding field) local accumulation, in other words, what is known as a virtual cathode has been set up. This effect most preferably is produced by the insertion of one or two auxiliary grids between the cathode and the electrode immediately adjacent the cathode.

Referring to the drawing containing several exemplified embodiments of the idea, Fig. 1 represents a circuit scheme which is mostly used for the production of assisted or dependent separately excited relaxation oscillations.

Figure 2:
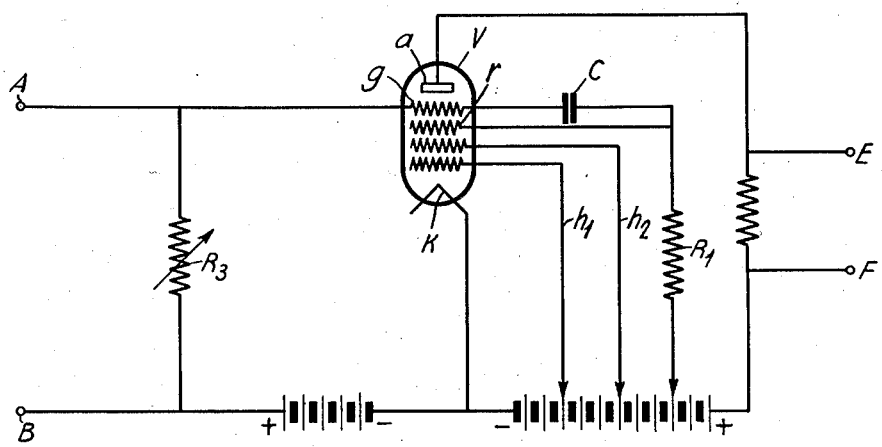

Fig. 2 shows a circuit arrangement which will be capable of free relaxation oscillations also in the absence of a separate control A. C. voltage.

Referring to Fig. 1 the tube V represents a tetrode containing a cathode $k$, an electrode $r$, an electrode $g$ and an anode $a$. Between the electrode $r$ and a point of constant positive potential in reference to the cathode is arranged the resistance R1 across whose terminals C and D impulses being in phase with the control impulses may be taken off. Between the electrodes $r$ and $g$ is connected the resistance R2. Associated with the electrode $g$ is the resistance R3 which unites this electrode with a point, preferably of negative voltage in reference to the cathode. The control alternating voltage is impressed upon the input terminals A and B and is fed to the cathode directly and to the electrode $g$ through the resistance R4. The impulses are preferably taken off across the terminals E, F, connected across the plate load resistor in the plate circuit inasmuch as reactions upon the system due to changes in load conditions are virtually suppressed and are consequently smaller than they would be where the output from the terminals C, D is used. In the case of a separately excited relaxation scheme it is advantageous to make the circuit impedances purely ohmic in nature in order that undesired phase deviations between control potential and useful potential may be avoided.

Referring to Fig. 2, the tube V is of the hexode type comprising a cathode $k$, two auxiliary grids connected through leads $h1$, $h2$, contiguous to the cathode, and electrode $r$, and electrode $g$ and an anode or plate $a$.

The auxiliary grids, with a view to producing apparent saturation, are united with points of positive potential in reference to the cathode. The electrode $r$ is connected by way of a resistance R1 with a point of high positive potential and a capacitive reactance C with the electrode $g$. At the same time the electrode $g$ is united by way of a variable resistance R3 with a point of positive potential in reference to the cathode. The relaxation oscillations may be taken off, on the one hand, between terminals A and B, especially if the resistance of the associated equipment is adequately high, or, on the other hand, across the terminals E and F in the plate circuit.

Fig. 2 shows a circuit organization possessing the property that, after the impulse has been brought to act, it is restored to the initial position or condition. It distinguishes itself from the scheme shown in Fig. 1 in that between the electrode $g$ and the electrode $r$ a condenser is connected. The presence of this condenser makes it mostly superfluous to unite the resistance R3 with a point of negative potential as had been shown in Fig. 1. If an impulse introduced from the outside is caused to act upon the grid $g$ there will be caused a variation of the current flowing through R1 so that, since the discharge circuit containing the cathode and the electrode $r$ has a negative slope there is incidentally occasioned a variation of the voltage acting across R1 which through C acts in the sense of promoting the original impulse. In the presence of a suitable value of a negative characteristic the amplification of the impulse will be so large that a linear potential drop will be produced across the terminals E, F, followed by an abrupt disappearance of a potential difference when the drop reaches a predetermined value. The value of the negative characteristic must be such that the absolute value of the product of the slope of the characteristic and the resistance R1 must be greater than unity. Experiments show that also this new state is not stable, so that periodic variations of this sort will result. The frequency of the process will be a function of the size of the condenser C, the resistance R3 and, most particularly, the value of the voltage of the battery which, in this instance, should preferably be positive, and which is interposed between R3 and the cathode. To vary the frequency it is recommendable to make resistance R3 variable or to use a variable biasing voltage.

Having thus described the invention, what is claimed and desired to secure by Letters Patent is the following:

1. An electronic system comprising a single thermionic tube having a cathode, an anode, and a plurality of control electrodes, a plurality of purely resistive elements, a biasing voltage source connected to the cathode and through one of the purely resistive elements to one of the control electrodes of said tube, a second voltage source connected between the cathode and anode through another of the purely resistive elements, said second voltage source being connected between the cathode and another of the control electrodes of said tube through another of said purely resistive elements, a capacitive element connection between the first and second named control electrodes, said purely resistive elements, capacitative element, and second voltage source being mutually proportioned so that a single stable operating state of the system is produced, in which state the system operates in absence of control impulses, and means for supplying control impulses across the resistive element connected between the cathode and the first named control electrode for periodically changing the operation of the system from the stable operating state to an instable operating state.

2. An electronic system comprising a single thermionic tube having a cathode, an anode, and a plurality of control electrodes, a plurality of purely resistive elements, a biasing voltage source connected to the cathode and through one of the purely resistive elements to one of the control electrodes of said tube, a second voltage source connected between the cathode and anode through another of the purely resistive elements, said second voltage source being connected between the cathode and another of the control electrodes of said tube through another of said purely resistive elements, a capacitive element connection between the first and second named control electrodes, said purely resistive elements, capacitative element, and second voltage source being mutually proportioned so that a single stable operating state of the system is produced, in which state the system operates in absence of control impulses, means for supplying control impulses across the resistive element connected between the cathode and the first named control electrode for periodically changing the operation of the system from the stable operating state to an instable operating state, direct connections to two other of the plurality of control electrodes to the second named voltage source, and connection means across the resistive element connecting the anode with the second named voltage source for deriving output energy.

3. An electronic system having a single stable operating state, comprising a single thermionic tube having a cathode, an anode, and a plurality of control electrodes, a plurality of purely resistive elements, a biasing voltage source connected to the cathode through one of the resistive elements to one of the control electrodes of the tube, a second voltage source connected between the cathode and anode through another of the purely resistive elements, said second voltage source being connected between the cathode and another of the control electrodes of said tube through another of said purely resistive elements, a capacitive element connection between the first and second named control electrodes, said purely resistive elements, capacitative element, and second voltage source being mutually proportioned so that the system is maintained in the stable operating state in absence of control impulses, and means for supplying control impulses across the resistive element connected between the cathode and the first named control electrode for periodically momentarily changing the operation of the system from the stable operating state to an instable operating state.

HANS OTTO ROOSENSTEIN.